United States Patent
Lang (10) Patent No.: US 10,404,845 B2
(45) Date of Patent: Sep. 3, 2019

(54) METHOD AND DEVICE FOR CONTROLLING NOTIFICATION CONTENT PREVIEW ON MOBILE TERMINAL, AND STORAGE MEDIUM

(71) Applicant: ONEPLUS TECHNOLOGY (SHENZHEN) CO., LTD., Shenzhen (CN)

(72) Inventor: Qidong Lang, Shenzhen (CN)

(73) Assignee: ONEPLUS TECHNOLOGY (SHENZHEN) CO., LTD., Shenzhen (CN)

( * ) Notice: Subject to any disclaimer, the term of this patent is extended or adjusted under 35 U.S.C. 154(b) by 0 days.

(21) Appl. No.: 15/573,869

(22) PCT Filed: Jan. 19, 2016

(86) PCT No.: PCT/CN2016/071382
§ 371 (c)(1),
(2) Date: Nov. 14, 2017

(87) PCT Pub. No.: WO2016/180050
PCT Pub. Date: Nov. 17, 2016

(65) Prior Publication Data
US 2018/0295225 A1 Oct. 11, 2018

(30) Foreign Application Priority Data

May 14, 2015 (CN) .......................... 2015 1 0246231

(51) Int. Cl.
*H04M 1/725* (2006.01)
*G06F 3/0481* (2013.01)
(Continued)

(52) U.S. Cl.
CPC ...... *H04M 1/72519* (2013.01); *G06F 1/1626* (2013.01); *G06F 1/3231* (2013.01);
(Continued)

(58) Field of Classification Search
CPC ............ H04N 5/4403; H04N 21/4126; H04N 21/4131; H04N 21/42203;
(Continued)

(56) References Cited

U.S. PATENT DOCUMENTS

2005/0032503 A1* 2/2005 Goto ................. H04M 1/72502
455/404.1
2010/0035656 A1* 2/2010 Pan ....................... G06F 1/1626
455/566
(Continued)

FOREIGN PATENT DOCUMENTS

CN 102830931 A 12/2012
CN 103064519 A 4/2013
(Continued)

OTHER PUBLICATIONS

International Search Report in international application No. PCT/CN2016/071382, dated Apr. 21, 2016.
(Continued)

*Primary Examiner* — Yuwen Pan
*Assistant Examiner* — Paul P Tran
(74) *Attorney, Agent, or Firm* — Syncoda LLC; Feng Ma (57) ABSTRACT

A method and device for controlling a notification content preview on a mobile terminal, and storage medium include: receiving a notification; determining whether a mobile terminal is in a held state; and if so, then generating a corresponding notification content preview according to the notification, and displaying the notification content preview on a screen of the mobile terminal. A user can therefore learn about a received notification content in time via a simple and effective manner.

7 Claims, 6 Drawing Sheets

(51) Int. Cl.
*G06F 1/16* (2006.01)
*G06F 1/3231* (2019.01)
*H04M 19/04* (2006.01)

(52) U.S. Cl.
CPC .......... *G06F 3/0481* (2013.01); *H04M 19/04* (2013.01); *G06F 2203/0339* (2013.01); *H04M 2250/12* (2013.01); *Y02D 10/173* (2018.01)

(58) Field of Classification Search
CPC ....... H04N 21/42207; H04N 21/42209; H04N 21/4222; H04N 21/4223; H04N 21/4394; H04N 21/44008; H04N 21/44218; H04N 21/422; H04M 1/0266; H04M 1/67; H04M 1/2519; H04M 1/72544; H04M 1/72569; H04M 1/00; H04M 1/72519; H04M 19/04; H04M 2250/12; G06F 1/1613; G06F 1/1626; G06F 1/1643; G06F 1/1684; G06F 1/169; G06F 1/3203; G06F 1/3215; G06F 1/3231; G06F 1/3262; G06F 1/3287; G06F 3/017; G06F 3/021; G06F 3/035; G06F 3/038; G06F 3/041; G06F 3/044; G06F 3/0481; G06F 3/0484; G06F 3/0485; G06F 3/0487; G06F 3/0488; G06F 3/04886; G06F 3/167; G06F 3/169; G06F 3/033; G06F 2203/0339; G06F 1/1692; G06F 1/1694; G06F 3/0412; G06F 3/0416; G06F 3/04883; G06Q 30/06; Y02D 10/173
USPC ................ 345/157, 158, 173, 174; 455/566; 704/231, 275; 713/300, 323, 324; 715/761, 825, 863
See application file for complete search history.

(56) References Cited

U.S. PATENT DOCUMENTS

| | | | | |
|---|---|---|---|---|
| 2010/0134423 A1* | 6/2010 | Brisebois | ............ | G06F 3/03547 345/173 |
| 2010/0138680 A1 | 6/2010 | Brisebois | | |
| 2011/0087963 A1* | 4/2011 | Brisebois | ............ | G06F 3/03547 715/702 |
| 2013/0021241 A1* | 1/2013 | Masaki | ................. | G06F 1/1626 345/156 |
| 2013/0021293 A1* | 1/2013 | Nakai | ................... | G06F 1/1626 345/174 |
| 2013/0124210 A1 | 5/2013 | Ouchi et al. | | |
| 2013/0187705 A1* | 7/2013 | Kaltner | ................... | G06F 3/044 327/517 |
| 2013/0222236 A1* | 8/2013 | Gardenfors | ........... | G06F 1/1626 345/156 |
| 2014/0091817 A1* | 4/2014 | Besshi | ................. | G06F 3/0418 324/684 |
| 2014/0320420 A1* | 10/2014 | Ida | ......................... | G06F 3/044 345/173 |
| 2015/0135145 A1* | 5/2015 | Kamide | ................ | G06F 3/0488 715/863 |
| 2016/0132123 A1 | 5/2016 | Jansky et al. | | |

FOREIGN PATENT DOCUMENTS

| | | | | |
|---|---|---|---|---|
| CN | 103118168 A | 5/2013 | | |
| CN | 103139377 A | 6/2013 | | |
| CN | 103176705 A | 6/2013 | | |
| CN | 103218037 A | 7/2013 | | |
| CN | 103412716 A | 11/2013 | | |
| CN | 103677521 A | 3/2014 | | |
| CN | 103777873 A | 5/2014 | | |
| CN | 104301504 A | 1/2015 | | |
| CN | 104468950 A | 3/2015 | | |
| CN | 104898923 A | 9/2015 | | |
| EP | 2175344 A2 | 4/2010 | | |
| EP | 2811361 A1 | 12/2014 | | |
| WO | WO-2014195581 A1 * | 12/2014 | ............. | H04M 1/67 |
| WO | 2015007232 A1 | 1/2015 | | |

OTHER PUBLICATIONS

English Translation of the Written Opinion of the International Search Authority in international application No. PCT/CN2016/071382, dated Apr. 21, 2016.

Supplementary European Search Report in European application No. 16791900.0, dated Apr. 17, 2018.

* cited by examiner

METHOD AND DEVICE FOR CONTROLLING NOTIFICATION CONTENT PREVIEW ON MOBILE TERMINAL, AND STORAGE MEDIUM

TECHNICAL FIELD

The present disclosure relates to the technical field of mobile terminals, and in particular to a method and device for controlling a notification content preview on a mobile terminal, and storage medium.

BACKGROUND

With the development of a smartphone technology, a user may receive various network push messages by means of a smartphone. The conventional method is that the user views a push message on a notification panel by pulling down a notification bar of the smartphone. If the user does not initiatively view the push message within a relatively long time, he/she cannot learn about a content of the push message in time. Therefore, how to enable the user to learn about the content of the message in time via a simple and effective manner becomes a technical problem to be solved at present.

SUMMARY

In light of this, to solve the above technical problem, it is necessary to provide a method and device for controlling a notification content preview on a mobile terminal, and storage medium that can enable a user to learn about a received notification content in time via a simple and effective manner.

The embodiments of the present disclosure provide a method for controlling a notification content preview on a mobile terminal, which includes the following steps.

A notification is received.

Whether the mobile terminal is in a held state is judged.

If yes, a corresponding notification content preview is generated according to the notification, and the notification content preview is displayed on a screen of the mobile terminal.

In one embodiment, the mobile terminal includes a sensor. The step of judging whether the mobile terminal is in the held state includes the following steps.

A capacitance value output by the sensor is acquired.

The capacitance value is compared with a preset threshold value. When the capacitance value is greater than the preset threshold value, it is recognized that the mobile terminal is in the held state.

In one embodiment, the sensor includes a first sensor and a second sensor. The first sensor and the second sensor are respectively arranged at two opposite long side edges of the mobile terminal or are respectively arranged at positions, adjacent to the two opposite long side edges, on a back of the mobile terminal. After the step of comparing the capacitance value with the preset threshold value, the method further includes the following steps.

A first capacitance value output by the first sensor and a second capacitance value output by the second sensor are acquired.

The first capacitance value and the second capacitance value are compared with a state threshold value to obtain contact states corresponding to the first capacitance value and the second capacitance value respectively.

The held state of the mobile terminal is recognized according to the contact states.

In one embodiment, after the step of judging whether the mobile terminal is in the held state, the method further includes the following steps.

Whether the mobile terminal is converted from a non-held state into the held state is monitored.

When the mobile terminal is converted from a non-held state into the held state, whether an unread notification exists is checked.

When there exits an unread notification, a corresponding notification content preview is generated according to the unread notification and the notification content preview is displayed on a screen of the mobile terminal.

In one embodiment, before the step of receiving the notification, the method further includes the following steps.

An application of receiving and/or sending the notification is displayed on a settings page.

A precedence order set by the user on the settings page for displaying the notification content preview is received.

The precedence order is stored.

The step of generating the corresponding notification content preview according to the notification and displaying the notification content preview on the screen of the mobile terminal includes the followings steps. The corresponding notification content preview is generated according to the notification and the notification content preview is displayed on the screen of the mobile terminal according to the precedence order.

The embodiments of the present disclosure provide a device for controlling a notification content preview on a mobile terminal, which includes a receiving module, a judging module and a display module.

The receiving module is configured to receive a notification.

The judging module is configured to judge whether the mobile terminal is in a held state.

The display module is configured to, if the mobile terminal is in the held state, generate a corresponding notification content preview according to the notification and display the notification content preview on a screen of the mobile terminal.

In one embodiment, the mobile terminal includes a sensor. The judging module includes an acquisition module and a recognition module.

The acquisition module is configured to acquire a capacitance value output by the sensor; and The recognition module is configured to: compare the capacitance value with a preset threshold value, and if the capacitance value is greater than the preset threshold value, recognize that the mobile terminal is in the held state.

In one embodiment, the sensor includes a first sensor and a second sensor. The first sensor and the second sensor are respectively arranged at two opposite long side edges of the mobile terminal or are respectively arranged at positions, adjacent to the two opposite long side edges, on a back of the mobile terminal. The acquisition module is further configured to acquire a first capacitance value output by the first sensor and a second capacitance value output by the second sensor.

The recognition module is further configured to compare the first capacitance value and the second capacitance value with a state threshold value to obtain contact states corresponding to the first capacitance value and the second capacitance value respectively; and recognize the held state of the mobile terminal according to the contact states.

In one embodiment, the device further includes a monitoring module and check module.

The monitoring module is configured to monitor whether the mobile terminal is converted from a non-held state into the held state.

The check module is configured to check whether an unread notification exists if it is monitored that the mobile terminal is converted from the non-held state into the held state.

The display module is further configured to, if there exists an unread notification, generate a corresponding notification content preview according to the unread notification, and display the notification content preview on the screen of the mobile terminal.

In one embodiment, the display module is further configured to display an application of receiving and/or sending the notification on a settings page. The receiving module is further configured to receive a precedence order set by the user on the settings page for displaying the notification content preview. The device further includes a storage module.

The storage module is configured to store the precedence order.

The display module is further configured to generate the corresponding notification content preview according to the notification and display the notification content preview on the screen of the mobile terminal according to the precedence order.

The embodiments of the present disclosure provide a storage medium; the storage medium includes a set of instructions. When the instructions are executed, at least one processor is caused to execute the following operations:

receiving a notification;

judging whether a mobile terminal is in a held state; and if yes, generating a corresponding notification content preview according to the notification and displaying the notification content preview on a screen of the mobile terminal.

According to the method and device for controlling the notification content preview on the mobile terminal, the notification is received. Whether the mobile terminal is in the held state is judged. If yes, the corresponding notification content preview is generated according to the notification and the notification content preview is displayed on the screen of the mobile terminal. After the notification is received, whether the mobile terminal is in the held state is judged first. If the mobile terminal is in the held state, the corresponding notification content preview of the notification is generated and the notification content preview is displayed on the screen of the mobile terminal. Therefore, the user can learn about the received notification content in time in a simple and effective manner.

DETAILED DESCRIPTION

First Embodiment

Figure 1:
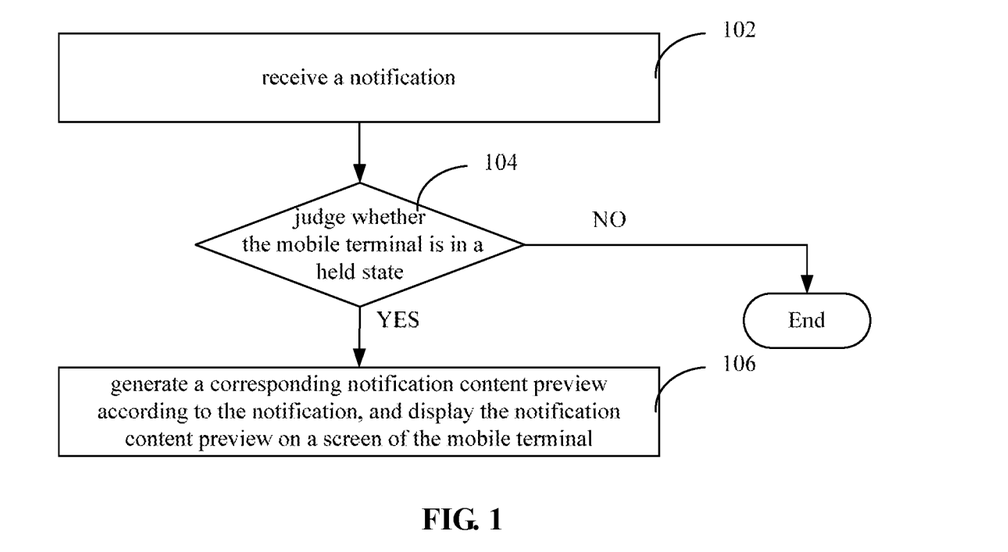
FIG. 1 is a flowchart of a method for controlling a notification content preview on a mobile terminal in one embodiment.

In one embodiment, as shown in FIG. 1, there is provided a method for controlling a notification content preview on a mobile terminal. It should be understood that, the steps in the flowchart in FIG. 1 are displayed in sequence as indicated by arrows but are not necessarily executed in sequence according to an order indicated by the arrows. Moreover, at least one part of the steps in FIG. 1 may include a plurality of sub-steps or a plurality of stages, in which these sub-steps or stages are not necessarily completed at a same moment and may be executed at different moments. The execution order also is not necessarily executed in sequence but may be executed with other steps or at least one part of the sub-steps or the stages of the other steps in turns or alternatively. The method specifically includes the following steps.

In step 102, a notification is received,

Herein, the notification refers to a notification received at a notification bar of the mobile terminal. The notification includes a local notification and a push notification.

The local notification includes a calendar notification, a missed call prompt and the like. The push notification includes a push message, a short message and a mail prompt, etc.

In the embodiment, the mobile terminal may include a smartphone, a tablet computer and the like capable of being installed with an application and sending the local notification and/or receiving the push notification.

In step 104, whether the mobile terminal is in a held state is judged; and if yes, a step 106 is entered, or otherwise the processing procedure is ended.

After the mobile terminal receives the notification, whether the mobile terminal is in the held state is judged. In one embodiment, the mobile terminal includes a sensor.

Correspondingly, the step of judging whether the mobile terminal is in the held state includes the following steps.

A capacitance value output by the sensor is acquired.

The capacitance value is compared with a preset threshold value. If the capacitance value is greater than the preset threshold value, it is recognized that the mobile terminal is in the held state.

The sensor on the mobile terminal senses that whether the user has a contact with the mobile terminal. When it is sensed that the user contacts the mobile terminal, a change will occur in the capacitance of the sensor. Preferably, the sensor is a grip sensor. The sensor generates the capacitance according to a contact area between the user and the mobile terminal and outputs a corresponding capacitance value. After the capacitance value output by the sensor is acquired, the capacitance value is compared with the preset threshold value. When the capacitance value is greater than the preset threshold value, it is recognized that the mobile terminal is in the held state. Therefore, by comparing the capacitance value output by the sensor with the preset threshold value, it can be recognized, simply and effectively, that whether the mobile terminal is in the held state.

In step 106, a corresponding notification content preview is generated according to the notification, and the generated notification content preview is displayed on a screen of the mobile terminal.

After that the mobile terminal is in the held state is recognized, a content of the notification is extracted, the corresponding notification content preview is generated in terms of a preset format and the notification content preview is displayed on the screen of the mobile terminal.

The preset format may merely include words, and also may include a combination of the words and a picture. The words in the preset format may be set with a word number limitation and those beyond the limitation will be neglected. The picture in the preset format may be set with a pixel limitation, and that beyond the limitation will be converted and displayed as a thumbnail less than the pixel limitation.

Further, the preset format further includes a font size. The font size may be displayed based on a mode selected by the user in advance.

According to the above solutions, the notification may be received. Whether the mobile terminal is in the held state is judged. If yes, the corresponding notification content preview is generated according to the notification and the notification content preview is displayed on the screen of the mobile terminal. After the notification is received, whether the mobile terminal is in the held state is judged first. If the mobile terminal is in the held state, the corresponding notification content preview of the notification is generated and the notification content preview is displayed on the screen of the mobile terminal. Therefore, the user can learn about the received notification content in time in a simple and effective manner.

Second Embodiment

In one embodiment, the sensor includes a first sensor and a second sensor. The first sensor and the second sensor are respectively arranged at two opposite long side edges of the mobile terminal or are respectively arranged at positions, adjacent to the two opposite long side edges, on a back of the mobile terminal. After the step of comparing the capacitance value with the preset threshold value, the method further includes the following steps. A first capacitance value output by the first sensor and a second capacitance value output by the second sensor are acquired. The first capacitance value and the second capacitance value are compared with a state threshold value to obtain contact states corresponding to the first capacitance value and the second capacitance value respectively. The held state of the mobile terminal is recognized according to the contact states.

In the embodiment here, the held state includes a one-handed holding and a two-handed holding. One-handed holding includes a left hand holding and a right hand holding. The first sensor and the second sensor are respectively arranged at the two opposite long side edges of the mobile terminal or are respectively arranged at the positions, adjacent to the two opposite long side edges, on a back of the mobile terminal. The first sensor includes multiple sensors and also may be called as a first sensor group. The second sensor includes multiple sensors and also may be called as a second sensor group. The capacitance value output by the first sensor, which is a first capacitance value, may be a sum of capacitance values output by the sensors in the first sensor group. The capacitance value output by the second sensor, which is a second capacitance value, may be a sum of capacitance values output by the sensors in the second sensor group. The capacitance value output by the sensor may vary depending on the contact area between the hand of the user and the sensor. Specifically, the larger the contact area is, the greater the output capacitance value is. The smaller the contact area is, the smaller the output capacitance value is.

Figure 2:
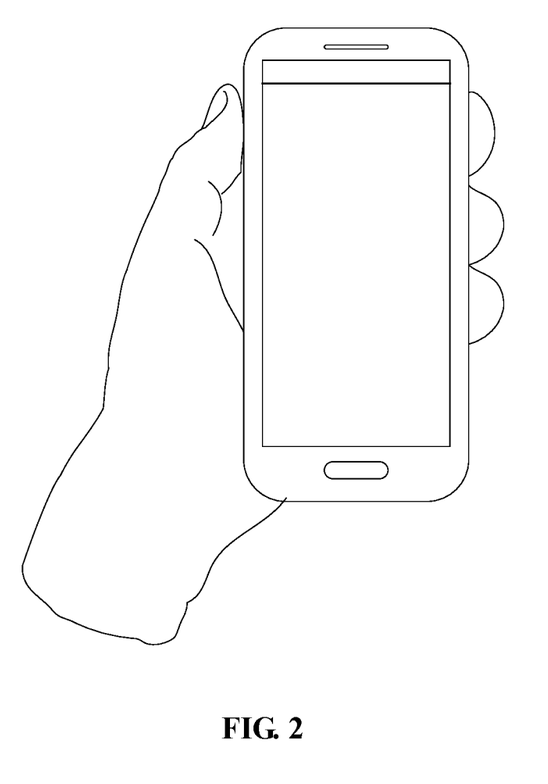
FIG. 2 is a systematic diagram of holding of a left hand in one embodiment.

The contact state includes a palm contact state and a finger contact state. The state threshold value corresponding to the contact state includes a first state threshold value and a second state threshold value. The first state threshold value is corresponding to the palm contact state, the second state threshold value is corresponding to the finger contact state and the first state threshold value is greater than the second state threshold value. The first capacitance value is compared with the first state threshold value and the second state threshold value respectively. When the first capacitance value is greater than or equal to the first state threshold value, it is indicated that the first capacitance value is corresponding to the palm contact state. When the first capacitance value is smaller than or equal to the second state threshold value and is greater than the preset threshold value, it is indicated that the first capacitance value is corresponding to the finger contact state. Likewise, the second capacitance value is compared with the first state threshold value and the second state threshold value such that the state corresponding to the second capacitance value can be recognized. If the contact states respectively corresponding to the first capacitance value and the second capacitance value are different, it is indicated that the mobile terminal is in the single-handed held state. If the contact states respectively corresponding to the first capacitance value and the second capacitance value are the same, it is indicated that the mobile terminal is in the two-handed held state. For example, if the first capacitance value is corresponding to the palm contact state and the second capacitance value is corresponding to the finger contact state, it is indicated that the mobile terminal is in the one-handed held state. If the first capacitance value is corresponding to the palm contact state and the second capacitance value is corresponding to the palm contact state, it is indicated that the mobile terminal is in the two-handed held state. As shown in FIG. 2, if the first sensor is positioned at a left side edge of the mobile terminal, the second sensor is positioned at a right side edge of the mobile terminal, the first capacitance value is corresponding to the palm contact state and the second capacitance value is corresponding to the finger contact state, it can be recognized that the mobile terminal is in the left hand held state at present. Therefore, according to the comparison between the capacitance value and the state threshold value, the held state in which the mobile terminal is can be recognized simply and conveniently.

In one embodiment, after the step of judging whether the mobile terminal is in the held state is judged, the method further includes the following steps. Whether the mobile terminal is converted from a non-held state into the held state is monitored. When it is monitored that the mobile terminal is converted from a non-held state into the held state, whether an unread notification exists is checked. When it is checked that there exists an unread notification, a corresponding notification content preview is generated according to the unread notification and the notification content preview is displayed on a screen of the mobile terminal.

In the embodiment here, if the mobile terminal is not in the held state, that is, the mobile terminal is in the non-held state after the notification is received, the notification content preview cannot be generated immediately. After it is monitored that the mobile terminal is converted from the non-held state into the held state, whether the unread notification exists is further checked by using the sensor. When the unread notification exists, the corresponding notification content preview is generated and the notification content preview is displayed on the screen of the mobile terminal. As a result, the notification that has been received and hasn't been read by the user can be displayed to the user effectively and timely, thereby providing a convenience for the user. If no unread notification is checked, it is indicated that the received notification has been read by the user and there is no need to prompt.

In one embodiment, before the step that the notification is received, the method further includes the following steps. An application of receiving and/or sending the notification is displayed on a settings page. A precedence order set by the user on the settings page for displaying the notification content preview is received, and the precedence order is stored. The step of generating the corresponding notification content preview according to the notification and displaying the notification content preview on the screen of the mobile terminal include the following steps. The corresponding notification content preview is generated according to the notification and the notification content preview is displayed on the screen of the mobile terminal according to the precedence order.

In the embodiment herein, the mobile terminal is provided with the settings page, such that the user can view an application program for receiving the push notification and an application program for sending the local notification on the settings page. Based on a personal preference, the user can select the application program for receiving the push notification and the application program for sending the local notification on the settings page. For the selected application program, the user may further set the precedence order for displaying the notification content preview according to the personal preference and stores the precedence order. For a plurality of received notifications, they also can be displayed on the screen of the mobile terminal in terms of the preset precedence order. Further, the notification preview content sorted in front may be displayed according to the preset font size. For the notification content preview that is sorted at the back and cannot be displayed by the screen of the mobile terminal, prompt information may be generated on the screen, for example "there are two notification content previews not shown". The notification content preview is displayed according to the preset precedence order, so the notification concerned by the user can be displayed timely, thereby providing the convenience for the user.

The above embodiments in the specific description only illustrate implementation manners of the corresponding steps. In a condition in which there is no logical contradiction, the above embodiments may be combined each other to form a new technical solution, and the new technical solution herein is still within the scope of the disclosure of the specific implementation manners.

Third Embodiment

Figure 3:
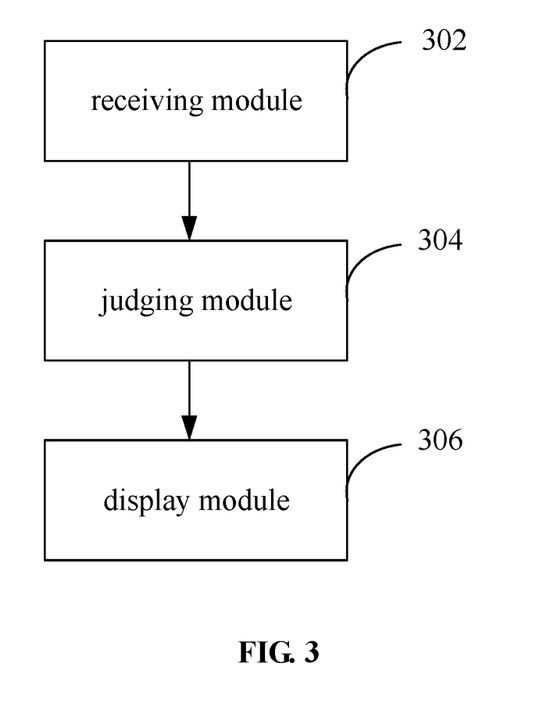
FIG. 3 is a structure diagram of a device for controlling a notification content preview on a mobile terminal in one embodiment.

In one embodiment, as shown in FIG. 3, there is provided a device for controlling a notification content preview on a mobile terminal. The device includes: a receiving module 302, a judging module 304 and a display module 306.

The receiving module 302 is configured to receive a notification.

The judging module 304 is configured to judge whether the mobile terminal is in a held state.

Figure 4:
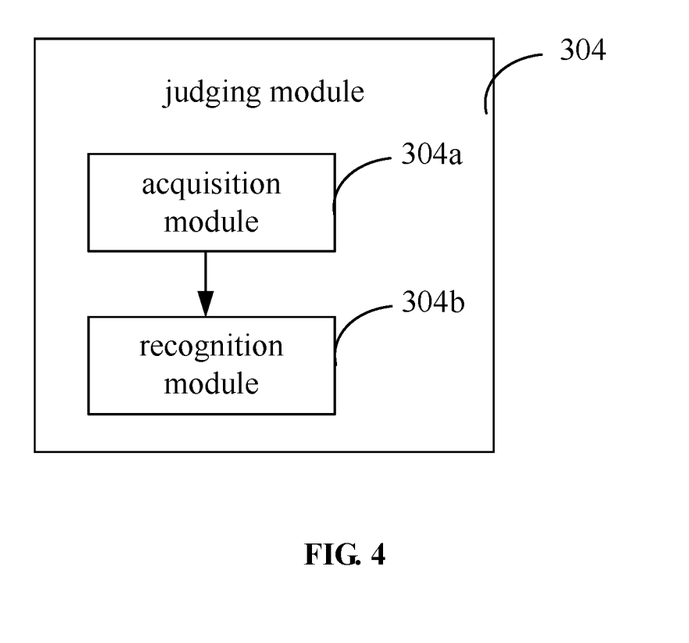
FIG. 4 is a structure diagram of a judging module in one embodiment.

In one embodiment, the mobile terminal includes a sensor. As shown in FIG. 4, the judging module 304 includes: an acquisition module 304a and a recognition module 304b. The acquisition module 304a is configured to acquire a capacitance value output by the sensor. The a recognition module 304b is configured to: compare the capacitance value with a preset threshold value, and if the capacitance value is greater than the preset threshold value, recognize that the mobile terminal is in the held state.

The display module 306 is configured to, if the mobile terminal is in the held state, generate a corresponding notification content preview according to the notification and display the notification content preview on a screen of the mobile terminal.

In the embodiment here, after the notification is received, whether the mobile terminal is in the held state is judged first. If the mobile terminal is in the held state, the corresponding notification content preview of the notification is generated and the notification content preview is displayed on the screen of the mobile terminal. Therefore, the user can learn about the received notification content in time in a simple and effective manner.

In one embodiment, the sensor includes a first sensor and a second sensor. The first sensor and the second sensor are respectively arranged at two opposite long side edges of the mobile terminal or are respectively arranged at positions, adjacent to the two opposite long side edges, on a back of the mobile terminal. The acquisition module 304a is further configured to acquire a first capacitance value output by the first sensor and a second capacitance value output by the second sensor. The recognition module 304b is further configured to compare the first capacitance value and the second capacitance value with a state threshold value to obtain contact states corresponding to the first capacitance value and the second capacitance value respectively; and recognize corresponding held states of the mobile terminal according to the contact states.

In the embodiment here, the held state includes a one-handed holding and a two-handed holding. The one-handed holding includes a left hand holding and a right hand holding. According to the comparison between the capacitance value and the state threshold value, the held state in which the mobile terminal is in can be recognized simply and conveniently.

Figure 5:
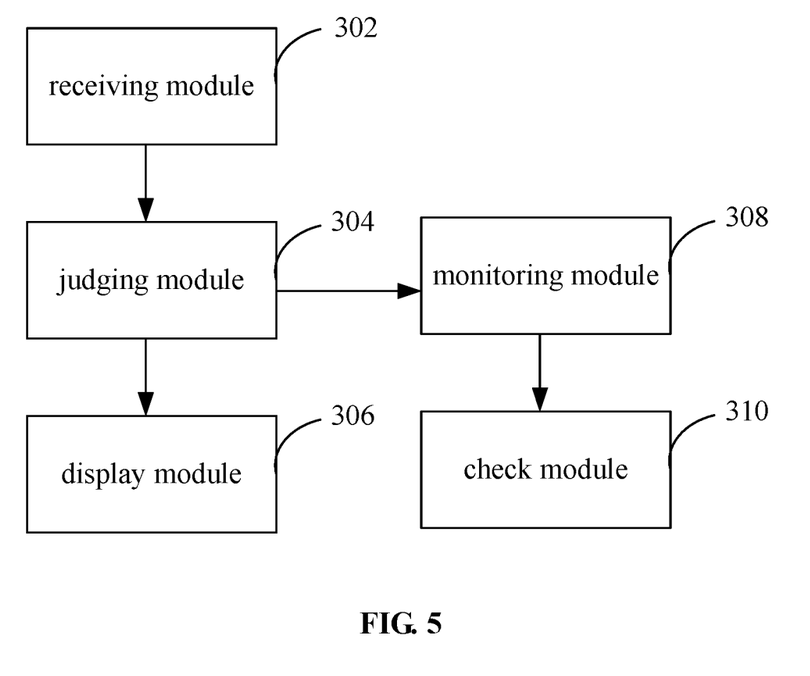
FIG. 5 is a structure diagram of a device for controlling a notification content preview on a mobile terminal in another embodiment.

In one embodiment, as shown in FIG. 5, the device further includes: a monitoring module 307 and a check module 310.

The monitoring module 308 is configured to monitor whether the mobile terminal is converted from a non-held state into the held state.

The check module 310 is configured to check whether an unread notification exists if it is monitored that the mobile terminal is converted from the non-held state into the held state.

The display module 306 is further configured to, when it is checked that there exists an unread notification, generate a corresponding notification content preview according to the unread notification, and display the notification content preview on the screen of the mobile terminal.

In the embodiment herein, the notification that has been received and hasn't been read by the user can be displayed to the user effectively and timely, thereby providing a convenience for the user. If no unread notification is checked, it is indicated that the received notification has been read by the user and there is no need to prompt.

Figure 6:
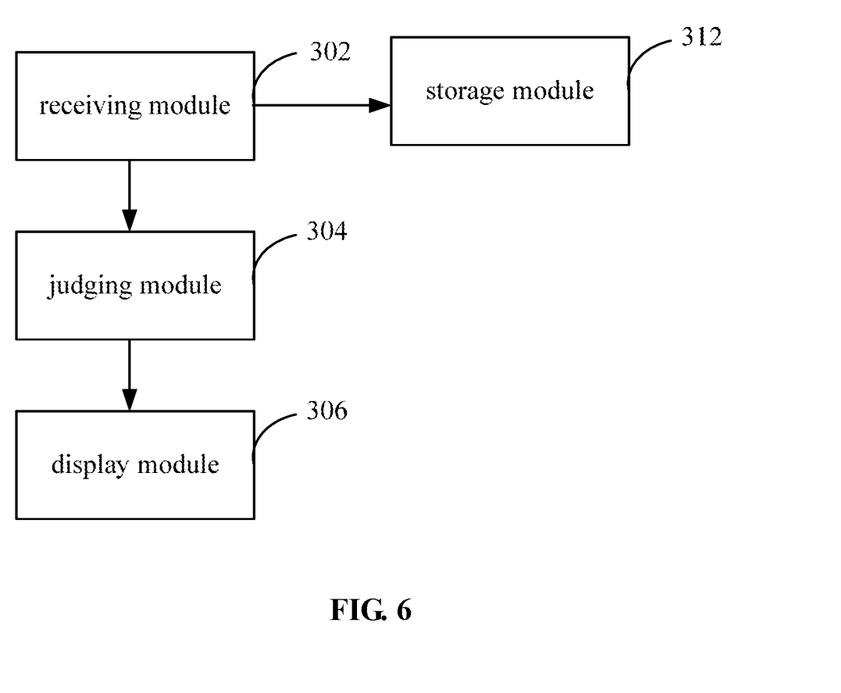
FIG. 6 is a structure diagram of a device for controlling a notification content preview on a mobile terminal in a still another embodiment.

In one embodiment, the display module 306 is further configured to display an application program for receiving the notification on a settings page. The receiving module 302 is further configured to receive a precedence order set by the user on the settings page for displaying the notification content preview. As shown in FIG. 6, the device further includes: a storage module 312, configured to store the precedence order. The display module 306 is further configured to generate the corresponding notification content preview according to the notification and display the notification content preview on the screen of the mobile terminal according to the precedence order.

In the embodiment here, the notification content preview is displayed according to the preset precedence order, such that the notification concerned by the user can be displayed timely, thereby providing the convenience for the user.

The embodiments of the present disclosure further provide a storage medium; the storage medium includes a set of instructions; when the instructions are executed, at least one processor is caused to execute the following operations: receiving a notification; judging whether a mobile terminal is in a held state; and if yes, generating a corresponding notification content preview according to the notification and displaying the notification content preview on a screen of the mobile terminal.

The technical characteristics of the above embodiments may be combined freely. To describe concisely, all possible combinations for each of the technical characteristics in the above embodiments are not described one by one. However, as long as there is no contradiction in the combinations of these technical characteristics, these combinations should be considered as the scope recorded by the specification.

The above embodiments only describe several implementation manners of the present disclosure. The description herein is specific and particular and should not be understood as limitations to the scope of protection of the present disclosure hereto. It should be noted that, those of ordinary skill in the art further may make various changes and modifications without departing from the concept of the present disclosure and all pertain to the scope of protection of the present disclosure. Hence, the scope of protection of the present disclosure shall be subjected to the appended claims.

The invention claimed is:

1. A method for controlling a notification content preview on a mobile terminal, the method comprising:
   receiving a notification;
   judging whether the mobile terminal is in a held state; and
   in response to the mobile terminal is in the held state, generating a corresponding notification content preview according to the notification, and displaying the notification content preview on a screen of the mobile terminal,
   wherein generating a corresponding notification content preview according to the notification comprise:
   extracting content of the notification, generating the corresponding notification content preview in terms of a preset format;
   wherein the mobile terminal comprises a sensor; judging whether the mobile terminal is in the held state comprises:
   acquiring a capacitance value output by the sensor; and
   comparing the capacitance value with a preset threshold value, and in response to the capacitance value is greater than the preset threshold value, recognizing that the mobile terminal is in the held state;
   and wherein the sensor comprises a first sensor and a second sensor; the first sensor and the second sensor are respectively arranged at two opposite long side edges of the mobile terminal or are respectively arranged at positions, adjacent to the two opposite long side edges, on a back of the mobile terminal; comparing the capacitance value with the preset threshold value comprises:
   acquiring a first capacitance value output by the first sensor and a second capacitance value output by the second sensor;
   comparing the first capacitance value and the second capacitance value with a state threshold value to obtain contact states corresponding to the first capacitance value and the second capacitance value respectively; and
   recognizing the held state of the mobile terminal according to the contact states;
   and wherein the state threshold value comprises a first state threshold value and a second state threshold value, the contact states comprise a palm contact state and a finger contact state, the first state threshold value is corresponding to the palm contact state, the second state threshold value is corresponding to the finger contact state, and the first state threshold value is greater than the second state threshold value; the held state comprises a one-handed held state and a two-handed held state; and
   wherein comparing the first capacitance value and the second capacitance value with the state threshold value to obtain the contact states corresponding to the first capacitance value and the second capacitance value respectively, and recognizing the held state of the mobile terminal according to the contact states comprises:
   comparing the first capacitance value with the first state threshold value and the second state threshold value respectively, determining that the first capacitance value is corresponding to the palm contact state in response to that the first capacitance value is greater than or equal to the first state threshold value, determining that the first capacitance value is corresponding to the finger contact state in response to that the first capacitance value is smaller than or equal to the second state threshold value and is greater than the preset threshold value;
   comparing the second capacitance value with the first state threshold value and the second state threshold value respectively, determining that the second capacitance value is corresponding to the palm contact state in response to that the second capacitance value is greater than or equal to the first state threshold value, determining that the second capacitance value is corresponding to the finger contact state in response to that the second capacitance value is smaller than or equal to the second state threshold value and is greater than the preset threshold value; and
   determining that the mobile terminal is in the one-handed held state in response to that the contact states respectively corresponding to the first capacitance value and the second capacitance value are different, determining that the mobile terminal is in the two-handed held state in response to that the contact states respectively corresponding to the first capacitance value and the second capacitance value are the same.

2. The method according to claim 1, wherein after the step of judging whether the mobile terminal is in the held state, the method further comprises:
   monitoring whether the mobile terminal is converted from a non-held state into the held state;

when it is monitored that the mobile terminal is converted from a non-held state into the held state, checking whether an unread notification exists; and when it is checked that there exits an unread notification, generating a corresponding notification content preview according to the unread notification and displaying the notification content preview on the screen of the mobile terminal.

3. The method according to claim 1, wherein before the step of receiving the notification, the method further comprises:

displaying an application of receiving and/or sending the notification on a settings page;

receiving a precedence order set by the user on the settings page for displaying the notification content preview; and storing the precedence order;

the step of generating the corresponding notification content preview according to the notification and displaying the notification content preview on the screen of the mobile terminal comprises: generating the corresponding notification content preview according to the notification and displaying the notification content preview on the screen of the mobile terminal according to the precedence order.

4. A device configured to control a notification content preview on a mobile terminal, the device comprising a processor and a memory for storing a set of instructions executable by the processor, wherein when the instructions are executed by the processor, the processor is configured to:

receive a notification;

judge whether the mobile terminal is in a held state; and in response to the mobile terminal is in the held state, extract content of the notification, generate the corresponding notification content preview in terms of a preset format and display the notification content preview on a screen of the mobile terminal;

wherein the mobile terminal comprises a sensor; in judging whether the mobile terminal is in the held state, the processor is further configured to:

acquire a capacitance value output by the sensor; and compare the capacitance value with a preset threshold value, and in response to the capacitance value is greater than the preset threshold value, recognize that the mobile terminal is in the held state;

and wherein the sensor comprises a first sensor and a second sensor; the first sensor and the second sensor are respectively arranged at two opposite long side edges of the mobile terminal or are respectively arranged at positions, adjacent to the two opposite long side edges, on a back of the mobile terminal; and in comparing the capacitance value with the preset threshold value, the processor is further configured to:

acquire a first capacitance value output by the first sensor and a second capacitance value output by the second sensor;

compare the first capacitance value and the second capacitance value with a state threshold value to obtain contact states corresponding to the first capacitance value and the second capacitance value respectively; and recognize the held state of the mobile terminal according to the contact states;

and wherein the state threshold value comprises a first state threshold value and a second state threshold value, the contact states comprise a palm contact state and a finger contact state, the first state threshold value is corresponding to the palm contact state, the second state threshold value is corresponding to the finger contact state, and the first state threshold value is greater than the second state threshold value; the held state comprises a one-handed held state and a two-handed held state; and wherein in comparing the first capacitance value and the second capacitance value with the state threshold value to obtain the contact states corresponding to the first capacitance value and the second capacitance value respectively, and recognize the held state of the mobile terminal according to the contact states, the processor is further configured to:

compare the first capacitance value with the first state threshold value and the second state threshold value respectively, determine that the first capacitance value is corresponding to the palm contact state in response to that the first capacitance value is greater than or equal to the first state threshold value, determine that the first capacitance value is corresponding to the finger contact state in response to that the first capacitance value is smaller than or equal to the second state threshold value and is greater than the preset threshold value;

compare the second capacitance value with the first state threshold value and the second state threshold value respectively, determine that the second capacitance value is corresponding to the palm contact state in response to that the second capacitance value is greater than or equal to the first state threshold value, determine that the second capacitance value is corresponding to the finger contact state in response to that the second capacitance value is smaller than or equal to the second state threshold value and is greater than the preset threshold value; and determine that the mobile terminal is in the one-handed held state in response to that the contact states respectively corresponding to the first capacitance value and the second capacitance value are different, determine that the mobile terminal is in the two-handed held state in response to that the contact states respectively corresponding to the first capacitance value and the second capacitance value are the same.

5. The device according to claim 4, wherein the processor is further configured to:

monitor whether the mobile terminal is converted from a non-held state into the held state; and check whether an unread notification exists when it is monitored that the mobile terminal is converted from the non-held state into the held state;

when it is checked that an unread notification exists, generate a corresponding notification content preview according to the unread notification, and display the notification content preview on the screen of the mobile terminal.

6. The device according to claim 4, wherein the processor is further configured to display an application of receiving and/or sending the notification on a settings page; receive a precedence order set by the user on the settings page for displaying the notification content preview;

store the precedence order;

generate the corresponding notification content preview according to the notification and display the notification content preview on the screen of the mobile terminal according to the precedence order.

7. A non-transitory storage medium, comprising a set of instructions, wherein when the instructions are executed, at least one processor is caused to execute the following operations:

receiving a notification;

judging whether the mobile terminal is in a held state; and in response to the mobile terminal is in the held state, generating a corresponding notification content preview according to the notification, and displaying the notification content preview on a screen of the mobile terminal, wherein the generating a corresponding notification content preview according to the notification comprise:

extracting content of the notification, generating the corresponding notification content preview in terms of a preset format;

wherein the mobile terminal comprises a sensor; the judging whether the mobile terminal is in the held state comprises:

acquiring a capacitance value output by the sensor; and comparing the capacitance value with a preset threshold value, and in response to the capacitance value is greater than the preset threshold value, recognizing that the mobile terminal is in the held state;

and wherein the sensor comprises a first sensor and a second sensor; the first sensor and the second sensor are respectively arranged at two opposite long side edges of the mobile terminal or are respectively arranged at positions, adjacent to the two opposite long side edges, on a back of the mobile terminal; and in the step of comparing the capacitance value with the preset threshold value, the method further comprises:

acquiring a first capacitance value output by the first sensor and a second capacitance value output by the second sensor;

comparing the first capacitance value and the second capacitance value with a state threshold value to obtain contact states corresponding to the first capacitance value and the second capacitance value respectively; and recognizing the held state of the mobile terminal according to the contact states;

and wherein the state threshold value comprises a first state threshold value and a second state threshold value, the contact states comprise a palm contact state and a finger contact state, the first state threshold value is corresponding to the palm contact state, the second state threshold value is corresponding to the finger contact state, and the first state threshold value is greater than the second state threshold value; the held state comprises a one-handed held state and a two-handed held state; and wherein comparing the first capacitance value and the second capacitance value with the state threshold value to obtain the contact states corresponding to the first capacitance value and the second capacitance value respectively, recognizing the held state of the mobile terminal according to the contact states comprises:

comparing the first capacitance value with the first state threshold value and the second state threshold value respectively, determining that the first capacitance value is corresponding to the palm contact state in response to that the first capacitance value is greater than or equal to the first state threshold value, determining that the first capacitance value is corresponding to the finger contact state in response to that the first capacitance value is smaller than or equal to the second state threshold value and is greater than the preset threshold value;

comparing the second capacitance value with the first state threshold value and the second state threshold value respectively, determining that the second capacitance value is corresponding to the palm contact state in response to that the second capacitance value is greater than or equal to the first state threshold value, determining that the second capacitance value is corresponding to the finger contact state in response to that the second capacitance value is smaller than or equal to the second state threshold value and is greater than the preset threshold value; and determining that the mobile terminal is in the one-handed held state in response to that the contact states respectively corresponding to the first capacitance value and the second capacitance value are different, determining that the mobile terminal is in the two-handed held state in response to that the contact states respectively corresponding to the first capacitance value and the second capacitance value are the same.

* * * * *